(12) United States Patent
Chen et al.

(10) Patent No.: US 7,820,251 B2
(45) Date of Patent: *Oct. 26, 2010

(54) LIQUID CRYSTAL COMPOUND AND LIQUID CRYSTAL DISPLAY UTILIZING THE SAME

(75) Inventors: An-Cheng Chen, Hsinchu (TW); Pei-Chen Huang, Taipei (TW); Kung-Lung Cheng, Hsinchu (TW); Shih-Hsien Liu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/563,365

(22) Filed: Sep. 21, 2009

(65) Prior Publication Data

US 2010/0009099 A1 Jan. 14, 2010

Related U.S. Application Data

(63) Continuation of application No. 12/061,675, filed on Apr. 3, 2008, now Pat. No. 7,648,743.

(30) Foreign Application Priority Data

Nov. 14, 2007 (TW) .............................. 96143004 A

(51) Int. Cl.
*C09K 19/30* (2006.01)
*C09K 19/12* (2006.01)
*C09K 19/20* (2006.01)
*C07C 25/24* (2006.01)
*C07C 43/225* (2006.01)

(52) U.S. Cl. .............. 428/1.1; 252/299.63; 252/299.66; 252/299.67; 568/647; 570/128

(58) Field of Classification Search ................... 428/1.1; 252/299.63, 299.66, 299.67; 570/128; 568/647
See application file for complete search history.

(56) References Cited

U.S. PATENT DOCUMENTS

| 5,262,085 | A | 11/1993 | Bartmann et al. |
| 6,143,198 | A | 11/2000 | Miyazawa et al. |
| 6,685,995 | B1 | 2/2004 | Haseba et al. |
| 7,648,743 | B2 * | 1/2010 | Chen et al. .................. 428/1.1 |
| 2007/0066617 | A1 | 3/2007 | Mita et al. |

FOREIGN PATENT DOCUMENTS

JP 2004175728 A * 6/2004

OTHER PUBLICATIONS

CAPLUS 1994: 244206.*
English translation by computer for JP 2004175728; http://www19.ipdl.inpit.go.jp/PA1/result/detail/main/wAAA7Fa4mFDA416175728P1.htm.*
"Advanced Liquid Crystal Television" Detlef Pauluth et al.; Liquid Crystals Division, Liquid Crystal Research, Merck KGaA; Jan. 2004; pp. 1219-1227.

* cited by examiner

*Primary Examiner*—Shean C Wu
(74) *Attorney, Agent, or Firm*—Thomas, Kayden, Horstemeyer & Risley

(57) ABSTRACT

The disclosed is a liquid crystal compound and method for manufacturing the same. The liquid crystal compound can be used alone or mixed with commercially available liquid crystal compounds. Because low rotational viscosity of the liquid crystal compound of the invention, it can be used as positive or negative dielectric anisotropic liquid crystal composition.

3 Claims, 1 Drawing Sheet

LIQUID CRYSTAL COMPOUND AND LIQUID CRYSTAL DISPLAY UTILIZING THE SAME

CROSS REFERENCE TO RELATED APPLICATIONS

This application is a Continuation of pending U.S. patent application Ser. No. 12/061,675, filed Apr. 3, 2008 and entitled "Liquid crystal compound and liquid crystal display utilizing the same", which claims the priority of Taiwan Patent Application No. 96143004, filed on Nov. 14, 2007, the entirety of which is incorporated by reference herein.

BACKGROUND OF THE INVENTION

1. Field of the Invention

The invention relates to a liquid crystal compound, and in particular to the synthesis and application thereof.

2. Description of the Related Art

Liquid crystal displays (hereinafter LCD) based on the twisted nematic (hereinafter TN) mode is the most common type of flat panel display (hereinafter FPD). The conventional TN LCD utilized in wristwatches or desk calculators can only contain a small number of matrix segments (e.g. 8*8), and therefore cannot be applied for displays with high information content, such as thin film transistor (TFT) LCDs, which actively switch a large number of segments (e.g. 1024*768). Nevertheless, despite performance improvements for TFT LCDs, conventional TN LCDs still hold advantages such as a lighter weight, smaller volume requirement, and lower power consumption. In the 1990s however, driven by developmental advancements for liquid crystal property, TFTs and the popularity of notebook computers, applications for TFT LCD usage have steadily increased. Coincidentally, during the later half of the 1990s, the popularity of fast switching helped to drive multimedia applications, thus allowing a cursor to follow fast movements of a mouse. With the visible area of a TFT LCD corresponding to that of a cathode ray tube (CRT), TFT LCDs were now being considered to be used as desktop monitors. However, increased application would be dependent upon improved viewing angle dependency of optical effect, especially contrast and color shift. As such, optical compensation films were introduced to improve optical effect. Meanwhile, also improving optical performance at the time was the development of new switching modes, such as in plane switching (IPS) and vertically aligned (VA) mode. Thus, allowing the TFT LCD computer monitors using the mentioned techniques to largely replace CRT monitors.

The prerequisite for liquid crystals is a broad nematic phase range of −40 to 100° C. in order to guarantee the so-called operating temperature range of LCDs. The clearing point of a liquid crystal is the temperature at which the liquid crystal phase vanishes. The clearing point must be at least 10° C. higher than the operating temperature of devices. In order to respond properly to an applied switching voltage, liquid crystals must exhibit dielectric anisotropy, defined as the difference of the dielectric constants parallel and perpendicular to the director of the nematic phase. Depending upon molecular structure, dielectric anisotropy can be positive (molecular dipole is parallel to the long axis of the molecule) or negative (molecular dipole is perpendicular to the long axis of the molecule). The switching time of an LCD, such as on-state to off-state or off-state to on-state, is proportional to the rotational viscosity ($\gamma 1$) of the liquid crystal, such that Low $\gamma 1$ may accelerate the switching time. The described properties are determined by the structural elements (side chain, rings, linking groups, and terminal group) of a liquid crystal molecule.

For achieving the above requirements, several papers such as J. Mater. Chem. 2004, 14, 1219 and patents such as U.S. Pat. Nos. 5,262,085, 6,143,198, or 6,685,995, disclose liquid crystal molecule designs. However, a novel liquid crystal molecule is still desired for improving LCD response time performance.

SUMMARY OF THE INVENTION

The invention provides a liquid crystal compound, having a general formula:

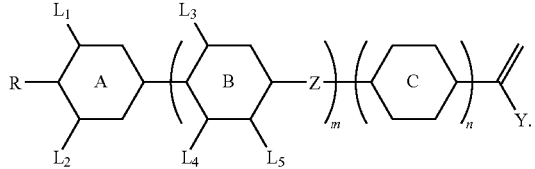

R is H, F, Cl linear or branched $C_{1-10}$ alkyl group, linear or branched $C_{1-10}$ alkenyl group, $C_{1-10}$ ether group, $C_{1-10}$ alkoxyl group, linear or branched $C_{1-10}$ fluorinated alkyl group, linear or branched $C_{1-10}$ fluorinated alkenyl group, or $C_{1-10}$ fluorinated ether group. Each of A, B, and C, being the same or different, is cyclohexyl group, cyclohexenyl group, tetrahydropyranyl group, dioxanyl group, dioxinyl group, phenyl group, pyridinyl group, pyridazinyl group, or pyrimidinyl group. Each of $L_1, L_2, L_3, L_4,$ and $L_5$, being the same or different, is H or F. Z is —C(=O)O—, —OC(=O)—, —CH$_2$O—, —OCH$_2$—, —CF$_2$O—, —OCF$_2$—, —CH$_2$CH$_2$—, —CF$_2$CF$_2$—, —C≡C—, or —CH=CH—. Y is CF$_3$, CF$_2$H, or CFH$_2$. m, n is independently selected from an integer of 0-2, and $1 \leq m+n \leq 3$.

The invention also provides a liquid crystal display comprising a top substrate, a bottom substrate, and a liquid crystal layer disposed between the bottom substrate and the bottom substrate, wherein the liquid crystal layer comprises the described liquid crystal compound.

The invention further provides an optoelectronic device, comprising the described liquid crystal device.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
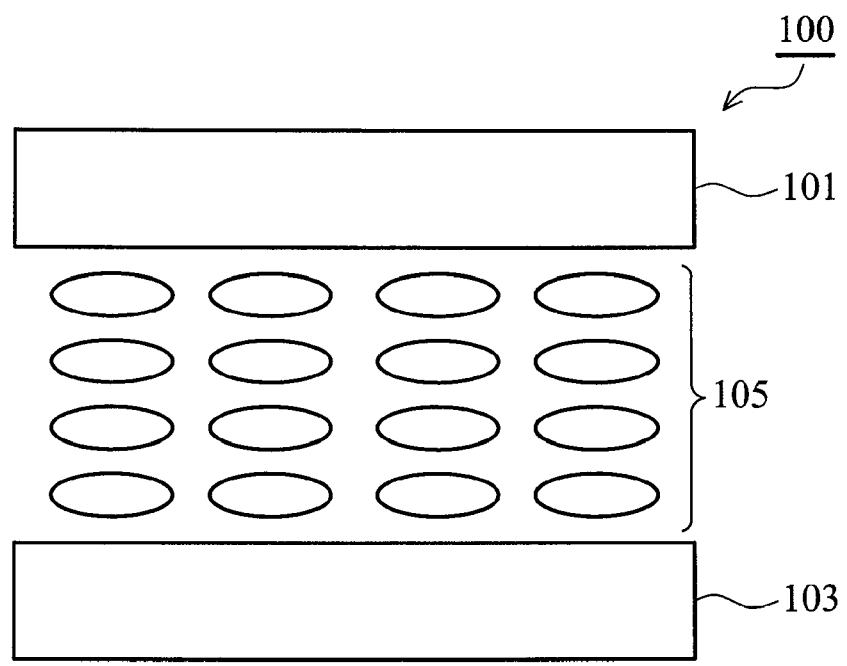
FIG. 1 shows a cross section of an LCD in an embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

The invention provides a liquid crystal compound as shown in Formula 1.

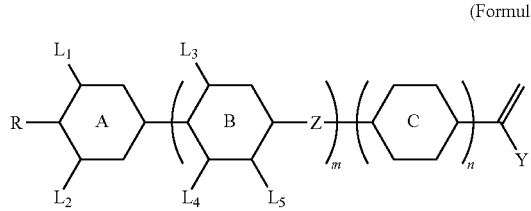
(Formula 1)

R is H, F, Cl, linear or branched $C_{1-10}$ alkyl group, linear or branched $C_{1-10}$ alkenyl group, $C_{1-10}$ ether group, $C_{1-10}$ alkoxyl group, linear or branched $C_{1-10}$ fluorinated alkyl group, linear or branched $C_{1-10}$ fluorinated alkenyl group, or $C_{1-10}$ fluorinated ether group. Each of A, B, and C, being the same or different, is a six member ring such as satured cyclohexyl group, unsatured cyclohexenyl group, or aromatic benzene ring. The carbon of the cyclohexyl group can be replaced by oxygen such as tetrahydropyranyl group or dioxanyl group. The carbon of the cyclohexenyl group can be replaced by oxygen such as dioxinyl group. The carbon of the phenyl group can be replaced by nitrogen such as pyridinyl group, pyridazinyl group, or pyrimidinyl group. Each of $L_1$, $L_2$, $L_3$, $L_4$, and $L_5$, being the same or different, is H or F. Z is —C(=O)O—, —OC(=O)—, —CH$_2$O—, —OCH$_2$—, —CF$_2$O—, —OCF$_2$—, —CH$_2$CH$_2$—, —CF$_2$CF$_2$—, —C≡C—, or —CH=CH—. Y is CF$_3$, CF$_2$H, or CFH$_2$. m, n is independently selected from an integer of 0-2, and 1≦m+n≦3. For achieving a linear structure, the substituents of the A, B, C rings in the liquid crystal compound are para substituted. For example, R and B ring are para substituted on the A ring.

The described liquid crystal compound includes two ring structures as shown in Formulae 2-5 or three ring structures as shown in Formulae 6-9.

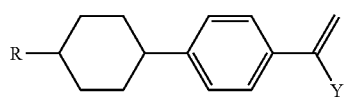
(Formula 2)

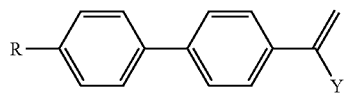
(Formula 3)

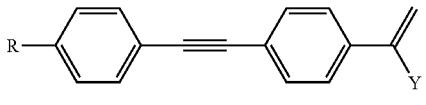
(Formula 4)

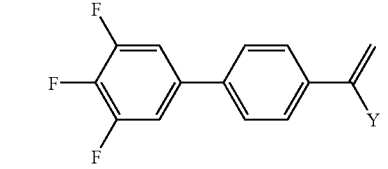
(Formula 5)

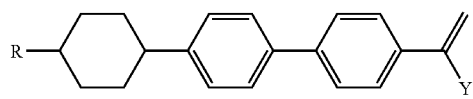
(Formula 6)

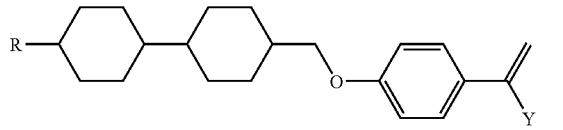
(Formula 7)

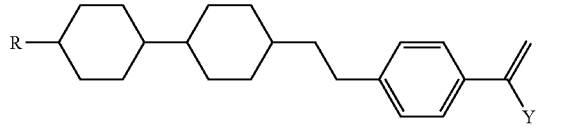
(Formula 8)

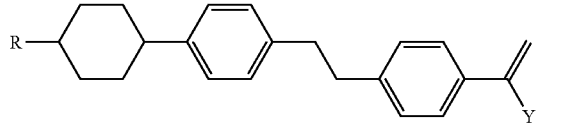
(Formula 9)

The liquid crystal compound of the invention can be used alone or accompanied with other liquid crystal compounds such as commercially available products. In one embodiment, the other liquid crystal compounds are shown as Formulae 10-12.

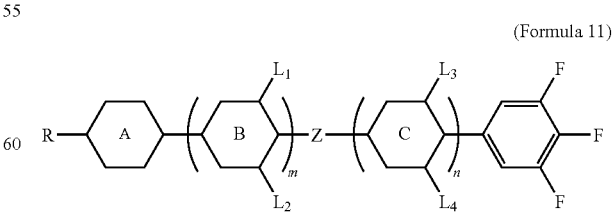
(Formula 10)

In Formula 10, each of R and R', being the same or different, is H, F, linear or branched $C_{1-10}$ alkyl group, linear or branched $C_{1-10}$ alkenyl group, or $C_{1-10}$ ether group. Each of A, B, and C, being the same or different, is a six member ring such as satured cyclohexyl group, unsatured cyclohexenyl group, or aromatic benzene ring. The carbon of the cyclohexyl group can be replaced by oxygen such as tetrahydropyranyl group or dioxanyl group. The carbon of the cyclohexenyl group can be replaced by oxygen such as dioxinyl group. The carbon of the phenyl group can be replaced by nitrogen such as pyridinyl group, pyridazinyl group, or pyrimidinyl group. Each of $L_1$ and $L_2$, being the same or different, is H, F, or Cl. Z is —C(=O)O—, —OC(=O)—, —CH$_2$O—, —OCH$_2$—, —CF$_2$O—, —OCF$_2$—, —CH$_2$CH$_2$—, —CF$_2$CF$_2$—, —C≡C—, or —CH=CH—. m, n is independently selected from an integer of 0-2, and 1≦m+n≦3.

(Formula 11)

In Formula 11, R is H, F, linear or branched $C_{1-10}$ alkyl group, linear or branched $C_{1-10}$ alkenyl group, or $C_{1-10}$ ether group. Each of A, B, and C, being the same or different, is a six member ring such as satured cyclohexyl group, unsatured cyclohexenyl group, or aromatic benzene ring. The carbon of the cyclohexyl group can be replaced by oxygen such as tetrahydropyranyl group or dioxanyl group. The carbon of the cyclohexenyl group can be replaced by oxygen such as dioxinyl group. The carbon of the phenyl group can be replaced by nitrogen such as pyridinyl group, pyridazinyl group, or pyrimidinyl group. Each of $L_1$ $L_2$, $L_3$, and $L_4$, being the same or different, is H or F. Z is —C(=O)O—, —OC(=O)—, —CH$_2$O—, —OCH$_2$—, —CF$_2$O—, —OCF$_2$—, —CH$_2$CH$_2$—, —CF$_2$CF$_2$—, —C≡C—, or —CH=CH—. m, n is independently selected from an integer of 0-2, and $0 \leq m+n \leq 2$.

(Formula 12)

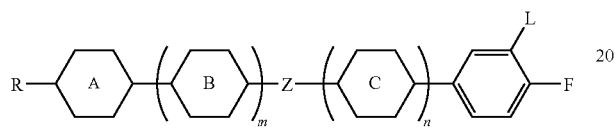

In Formula 12, R is H, F, linear or branched $C_{1-10}$ alkyl group, linear or branched $C_{1-10}$ alkenyl group, or $C_{1-10}$ ether group. Each of A, B, and C, being the same or different, is a six member ring such as satured cyclohexyl group, unsatured cyclohexenyl group, or aromatic benzene ring. The carbon of the cyclohexyl group can be replaced by oxygen such as tetrahydropyranyl group or dioxanyl group. The carbon of the cyclohexenyl group can be replaced by oxygen such as dioxinyl group. The carbon of the phenyl group can be replaced by nitrogen such as pyridinyl group, pyridazinyl group, or pyrimidinyl group. L is H or F. Z is —C(=O)O—, —OC(=O)—, —CH$_2$O—, —OCH$_2$—, —CF$_2$O—, —OCF$_2$—, —CH$_2$CH$_2$—, —CF$_2$CF$_2$—, —C≡C—, or —CH=CH—. m, n is independently selected from an integer of 0-2, and $0 \leq m+n \leq 2$.

While various structures are applied with the core part in the general formula 1 described above, they make the compounds develop excellent characteristics. Among them, some further examples are shown in following general formulae 13 to 30 are preferred. The definition of groups R and Y, rings A, B, and C, are same as above.

(Formula 13)

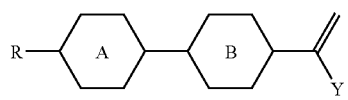

(Formula 14)

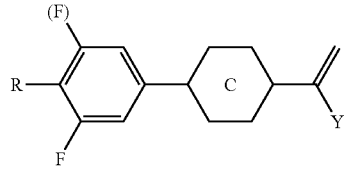

(Formula 15)

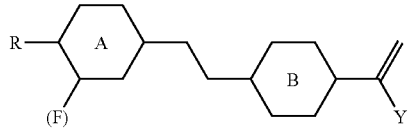

-continued (Formula 16)

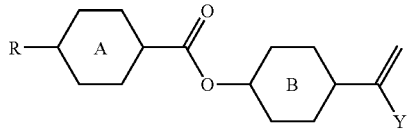

(Formula 17)

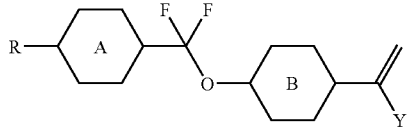

(Formula 18)

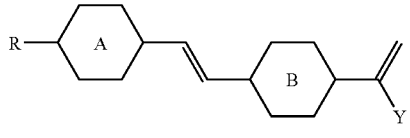

(Formula 19)

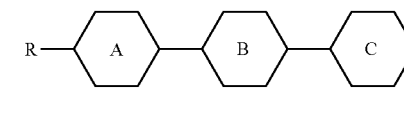

(Formula 20)

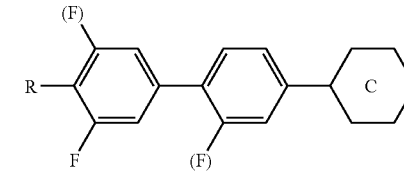

(Formula 21)

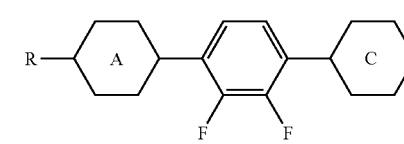

(Formula 22)

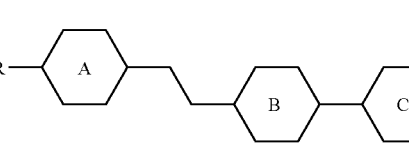

(Formula 23)

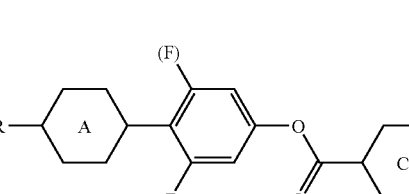

(Formula 24)

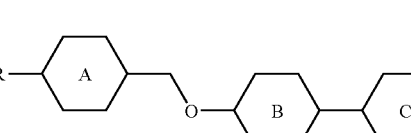

(Formula 25)

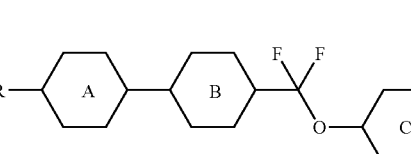

-continued

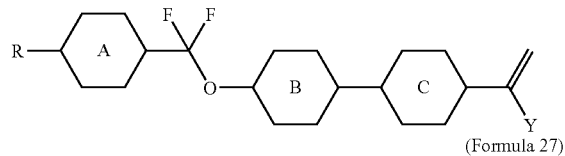
(Formula 26)

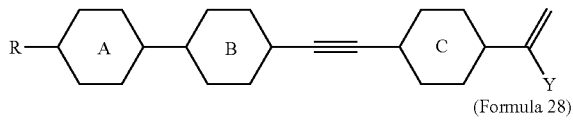
(Formula 27)

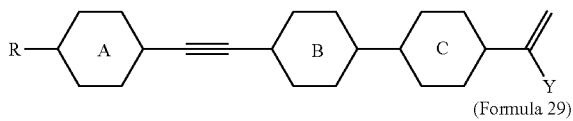
(Formula 28)

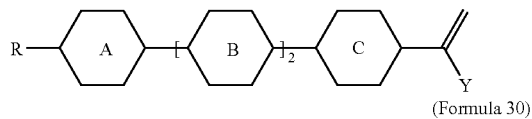
(Formula 29)

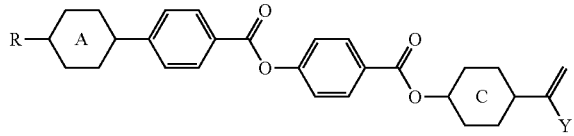
(Formula 30)

Because the liquid crystal compound of the invention and the commercially available liquid crystal compound have similar structures, the combination thereof may prevent problems such as low miscibility or un-dissolvable solids. In addition, the liquid crystal compound of the invention has wide nematic liquid crystal temperature range, low viscosity, low driving voltage, and short response time, such that the liquid crystal compound is suitable for transmission, reflection, or transflection LCD and to be driven by TN, IPS, or VA mode. Accordingly, the liquid crystal compound of the invention may efficiently improve the LCD panel performance.

FIG. 1 shows a cross section of an LCD in one embodiment of the invention. The LCD 100 includes a top substrate 101 and a bottom substrate 103 and a liquid layer 105 disposed therebetween. In one embodiment, one of the substrates is a color filter substrate and another substrate is an array substrate. In one embodiment, one of the substrates is an array on color filter substrate (AOC) or color filter on array substrate (COA), and another substrate is a transparent substrate such as glass or plastic. The liquid crystal layer 105 includes the liquid crystal compound of the invention, thereby reducing the response time.

Figure 2:
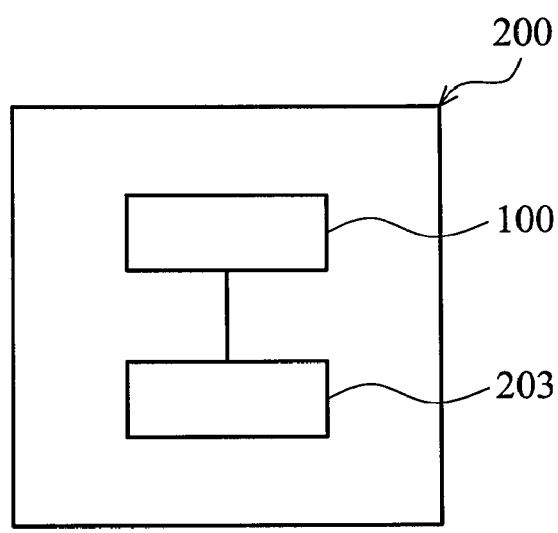
FIG. 2 is a diagram of an optoelectronic device 200 in an embodiment of the invention.

FIG. 2 is a diagram of an optoelectronic device 200 in an embodiment of the invention. Referring to FIG. 2, the LCD panel 100 of the aforementioned embodiments is applied in the optoelectronic device 200 and connected to an electric device 203 such as a control device, operator device, process device, input device, memory device, driving device, illumination device, protection device, or other functional device, or combinations thereof. The electronic apparatus can be a mobile product such as a cell phone, video camera, camera, laptop computer, video game console, watch, music player, E-mail transceiver, digital photo-frame, electronic map navigation, and the like. The electronic apparatus can be visual- audio products (such as media players and the like), a monitor, a television, a billboard (such as indoor/outdoor), a projector, or others.

EXAMPLES

The raw materials, solvents, or silica gel for chromatography were commercially available from fine chemical supply, such as Affa (Lancaster), TCI, Aldrich, Acros, Merck, and the likes.

The synthesis of the liquid crystal compound is described as below, a series of compounds were completed by 2-5 reactions.

The compound properties such as electricity were analyzed by Bruker advance DRX-400 NMR, LC Vision LCAS(I), Autronic-MELCHERS GmbH DMS 803, Abbe refractometer, TA Q10 thermal differential scanning calorimetry (DSC), Olympus Mx40 polarized optical microscope, or other related instruments.

Example 1

The Synthesis of Compound 1-4

Commercially available starting material was charged in a reaction bottle, added dried tetrahydrofuran (hereinafter THF) as solvent, added n-butyl lithium in dry-ice bath (−78° C.), and stirred at low temperature for 30 minutes. The mixture was then dropwise added trifluoromethyl acetate ($CF_3CO_2Et$), retained in low temperature for 15 minutes, slowly warmed up to room temperature, and reacted at room temperature for 4 hours. The reaction was quenched by adding satured NaCl solution at room temperature, and then extracted by ethyl ether. The organic layer of the extraction was dried by anhydrous $MgSO_4$ and concentrated to form crude. The crude was purified by recrystallization with hexane to form intermediate.

Methyltriphenylphosphonium bromide, dried THF, and potassium t-butoxide were sequentially charged in another reaction bottle in ice bath and stirred for half hour to be evenly mixed. The mixture were added the described intermediate in ice bath and reacted for 1 hour. After removing the ice bath, the reaction was reacted at room temperature for another 2 hours. The reaction was quenched by satured NaCl solution, and then extracted by hexane. The organic layer of the extraction was dried and concentrated to form crude. The crude was purified by chromatography, with a few silica gel and hexane as eluent, to form compounds 1-4. The described reaction was shown as Formula 13, and the total yield was about 45-60%. Measured by DSC, the phase transfer point in heating was 16.5° C. for compound 1, 9.2° C. for compound 2, 54.6° C. for compound 3, and 44.7° C. and 47.8° C. for compound 4, respectively. The compound 4 had apparent liquid crystal phase and compounds 1-3 showed a phase transfer point while cooling, meaning compounds 1-4 were all liquid crystal materials.

The $^1H$ NMR spectrum (400 MHz, $CDCl_3$) of compound 1: δ 0.89-1.47 (m, 12H), 1.91 (m, 4H), 2.50 (tt, J=12.0, 3.2 Hz, 1H), 5.75 (d, J=1.0 Hz), 5.91 (d, J=1.0 Hz, 1H), 7.22 (d, J=8.0 Hz, 2H), 7.38 (d, J=8.0 Hz, 2H).

The $^1H$ NMR spectrum (400 MHz, $CDCl_3$) of compound 2: δ 0.86-1.43 (m, 16H), 1.89 (m, 4H), 2.50 (tt, J=12.0, 4.0 Hz, 1H), 5.75 (d, J=1.0 Hz), 5.91 (d, J=1.0 Hz, 1H), 7.22 (d, J=8.0 Hz, 2H), 7.38 (d, J=8.0 Hz, 2H).

The $^1H$ NMR spectrum (400 MHz, $CDCl_3$) of compound 3: δ 0.91 (m, 3H), 1.37 (m, 4H), 1.65 (m, 2H), 2.67 (t, J=7.6 Hz, 2H), 5.84 (d, J=1.4 Hz, 1H), 5.98 (d, J=1.4 Hz, 1H), 7.27 (d, J=8.0 Hz, 2H), 7.53-7.62 (m, 4H), 7.63 (d, J=8.0 Hz, 2H).

The $^1$H NMR spectrum (400 MHz, CDCl$_3$) of compound 4: δ 0.87 (t, J=7.2 Hz, 3H), 1.29-1.35 (m, 8H), 1.66 (m, 2H), 2.64 (t, J=7.6 Hz, 2H), 5.82 (d, J=1.2 Hz, 1H), 5.97 (d, J=1.2 Hz, 1H), 7.26 (d, J=6.4 Hz, 2H), 7.51-7.53 (m, 4H), 7.60 (d, J=6.4 Hz, 2H).

(Formula 13)

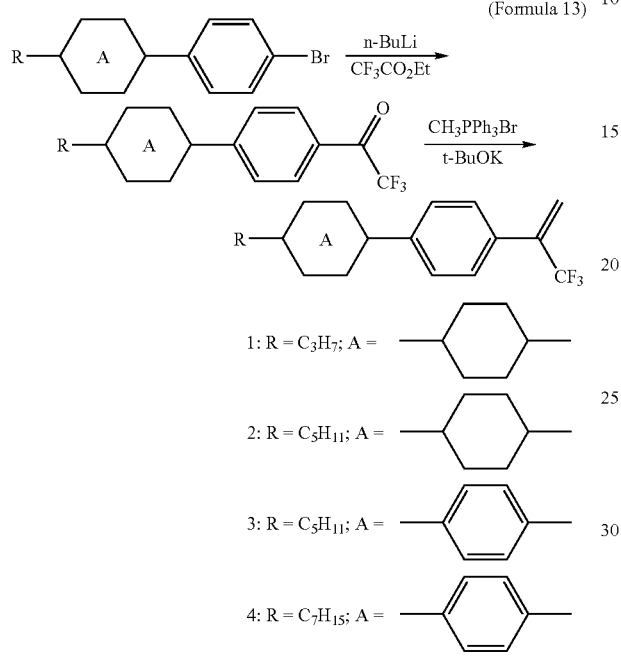

Example 2

The Synthesis of Compound 5

1-butyl-4-ethynyl benzene, 1-bromo-4-iodobenzene, sodium carbonate, tetrakis-(triphenyl phosphine) palladium, 1,2-dimethoxyethane (hereinafter DME), and deionized water were sequentially charged in a reaction bottle. The mixture was heated to 70° C. and reacted under nitrogen for 8 hours. The resulting material was filtered by celite to remove solid, extracted by satured NaCl solution and hexane. The organic layer of the extraction was dried and concentrated to form crude. The crude was purified by chromatography, with a few silica gel and hexane as eluent, to form intermediate. The intermediate was processed as the reaction as described in Example 3 to form compound 5. The described reaction is shown in Formula 14. The compound 5 had a melting point of 26.1° C.

The $^1$H NMR spectrum (400 MHz, CDCl$_3$) of compound 5: δ 0.94 (t, J=7.2 Hz, 3H), 1.26-1.39 (m, 2H), 1.56-1.65 (m, 2H), 2.63 (t, J=7.6 Hz, 2H), 5.83 (s, 1H), 5.99 (s, 1H), 7.18 (d, J=8.0 Hz, 2H), 7.44-7.47 (m, 4H), 7.54 (d, J=8.4 Hz, 2H).

(Formula 14)

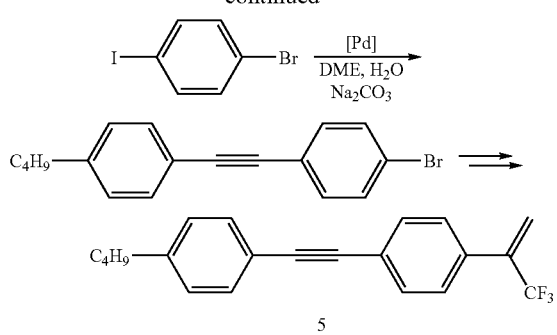

Example 3

The Synthesis of Compound 5

Commercially available starting material was dissolved in dried THF, added Mg (piece) and slightly heated to start the reaction, then stirred for 30 minutes. The reaction was then set in ice bath to add trimethyl borate, and then stirred at room temperature for 2 hours. The reaction was terminated by 6N HCl, and then stirred at room temperature for 4 hours. The resulting material was extracted by satured NaCl solution and a great amount of ethyl ether. The organic layer of the extraction was concentrated to form crude, and the crude was purified by recrystallization (ether/hexane) to form boranic acid intermediate. The boranic acid intermediate was then processed as the reaction described in Example 2 to form bromide intermediate. The bromide intermediate was then processed as the reaction described in Example 1 to form compound 6. The described reaction is shown in Formula 15. The compound 6 had a melting point of 150.2° C.

The $^1$H NMR spectrum (400 MHz, CDCl$_3$) of compound 6: δ 0.91 (m, 3H), 0.94-1.16 (m, 2H), 1.27-1.33 (m, 8H), 1.46-1.56 (m, 3H), 1.89-1.96 (m, 4H), 2.53 (tt, J=12.0, 4.0 Hz, 1H), 5.84 (s, 1H), 5.98 (s, 1H), 7.31 (d, J=8.0 Hz, 2H), 7.53-7.54 (m, 4H), 7.62 (d, J=8.0 Hz, 2H).

(Formula 15)

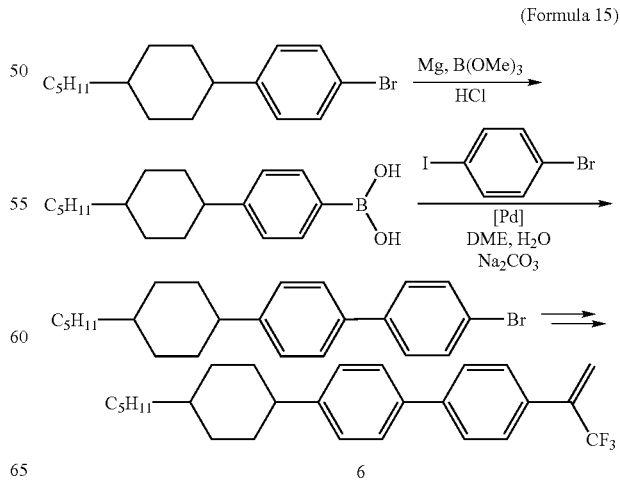

Example 4

The Synthesis of Compound 7

Lithium aluminum hydride (LAH) was charged in a reaction bottle, added a few dried THF as solvent, and stirred in ice bath for 5 minutes to be evenly mixed. The commercially available staring material dissolved in THF was dropwise added to the mixture in ice bath, and the ice bath was then removed. When the temperature of the reaction bottle reached room temperature, the reaction was slightly heated to reflux and reacted in reflux for another 4 hours and then cooled to room temperature. The reaction was terminated by concentrated HCl and extracted by satured NaCl solution and ethyl ether. The organic layer of the extraction was dried by anhydrous $MgSO_4$ and concentrated to form crude. The crude was added to HBr solution (48%), refluxed for 24 hours, and extracted by satured NaCl solution and ethyl ether. The organic layer of the extraction was dried by anhydrous $MgSO_4$, concentrated, and purified by chromatography to form pure bromide intermediate. The eluent of the chromatography was ethyl acetate/hexane (1/8). The bromide intermediate was dissolved in dimethyl foramide (hereinafter DMF), added 4-bromophenol and potassium carbonate, heated to 60° C. and stirred for 12 hours to complete the reaction. The resulting material was extracted by water and hexane, the organic layer of the extraction was dried and concentrated to form crude. The crude was then purified by recrystallization with hexane, and the purified crude was processed as the reaction described in Example 1 to form compound 7. The described reaction is shown in Formula 16. Compound 7 had two phase transfer points (76.1° C. and 111.9° C.) in heating. In addition, the liquid phase of the compound 7 was determined by polarized optical microscope.

The $^1H$ NMR spectrum (400 MHz, $CDCl_3$) of compound 7: δ 0.86-1.31 (m, 21H), 1.74-1.77 (m, 6H), 2.02 (m, 2H), 3.75 (d, J=9.6 Hz, 2H), 5.68 (d, J=1.0 Hz, 1H), 5.85 (d, J=1.0 Hz, 1H), 6.88 (d, J=8.6 Hz, 2H), 7.37 (d, J=8.6 Hz, 2H).

Example 5

The Synthesis of Compound 8 and 9

The bromide intermediate was formed by different starting material accompanying a similar reaction as described in Example 4. The bromide intermediate and a great amount of triphenylphosphine ($PPh_3$) were charged in a reaction bottle, heated to 80° C. and reacted for 10 hour to obtain a white solid. The white solid was washed by hexane to remove un-reacted $PPh_3$, and reacted with bromobenzaldehyde to process a Wittig reaction to form an intermediate with an alkylene bridge. The intermediate with an alkylene bridge was purified by chromatography with hexane as eluent, and then processed a hydrogenation for transferring alkylene bridge to alky bridge. The hydrogenated intermediate was processed as the reaction described in Example 1 to form compound 8 and 9. The described reaction is shown in Formula 17. Compound 8 had a melting point of 134.2° C., and Compound 9 had a melting point of 91.7° C.

The $^1H$ NMR spectrum (400 MHz, $CDCl_3$) of compound 8: δ 0.86-1.31 (m, 17H), 1.51-1.53 (m, 2H), 1.72-1.85 (m, 8H), 2.6-2.67 (m, 2H), 3.16 (m, 2H), 5.77 (d, J=1.2 Hz, 1H), 5.93 (d, J=1.2 Hz, 1H), 7.19 (d, J=8.0 Hz, 2H), 7.39 (d, J=8.0 Hz, 2H). The $^1H$ NMR spectrum (400 MHz, $CDCl_3$) of compound 9: δ 0.88-0.93 (m, 3H), 1.04-1.07 (m, 2H), 1.25-1.47 (m, 7H), 1.89 (m, 4H), 2.46 (tt, J=12.0, 4.0 Hz, 1H), 2.93 (m, 4H), 5.77 (s, 1H), 5.94 (s, 1H), 7.24 (d, J=8.0 Hz, 2H), 7.40 (d, J=8.0 Hz, 2H).

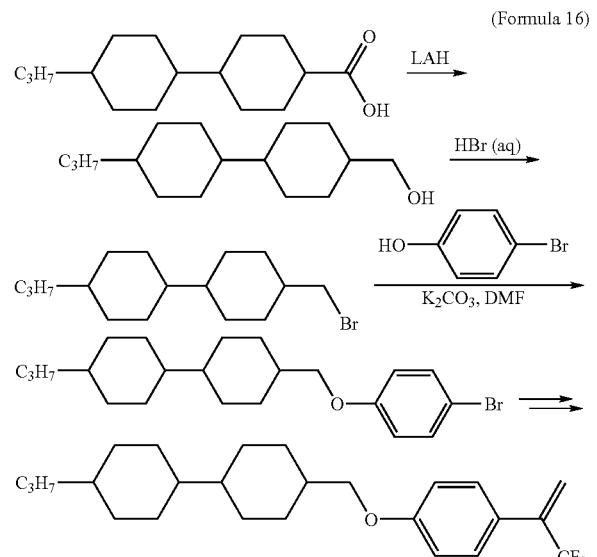

(Formula 16)

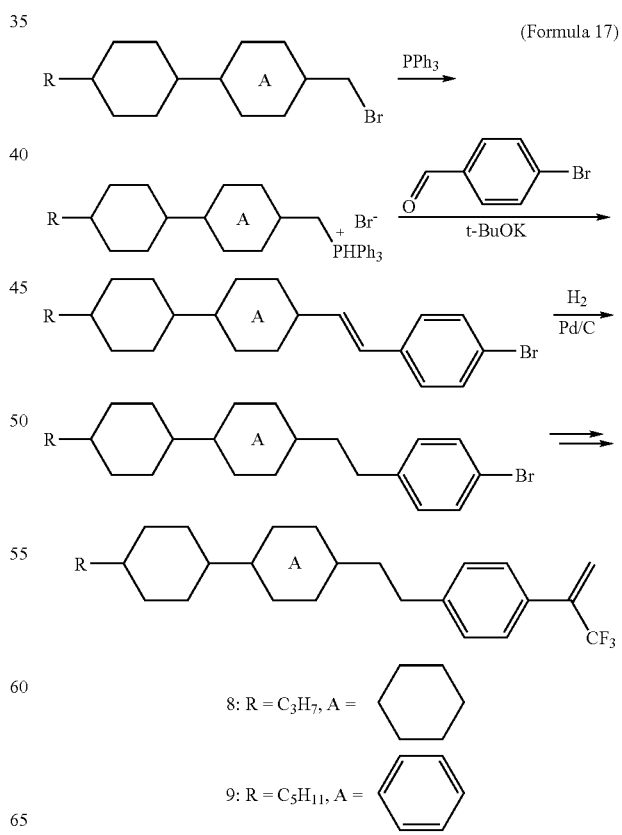

(Formula 17)

Example 6

The Synthesis of Compound 10

Trifluorobronic acid was selected as starting material to process reaction described in Example 2 to form bromide intermediate. The bromide intermediate was processed as the reaction described in Example 1 to form compound 10. The described reaction is shown in Formula 18.

The $^1$H NMR spectrum (400 MHz, CDCl$_3$) of compound 10: δ 5.85 (d, J=1.4 Hz, 1H), 6.02 (d, J=1.4 Hz, 1H), 7.21 (m, 2H), 7.54 (m, 4H).

(Formula 18)

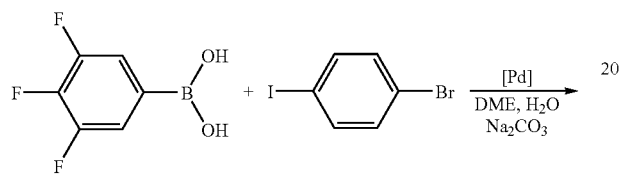

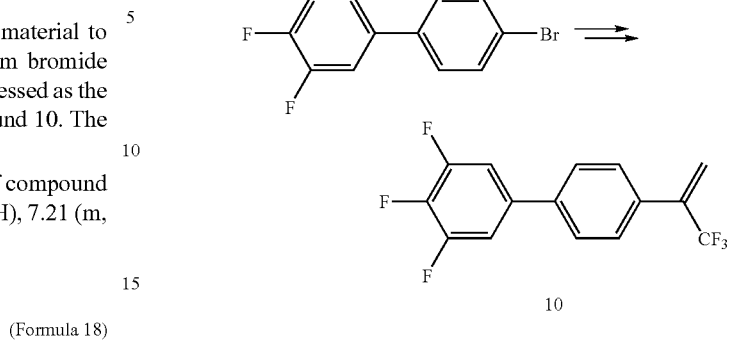

Example 7

Preparation of Liquid Crystal Mixture

Commercially available liquid crystal compound were mixed in different ratios to form a liquid crystal combination. The structure and the weight ratio of the liquid crystal compounds were tabulated as in Table 1.

TABLE 1

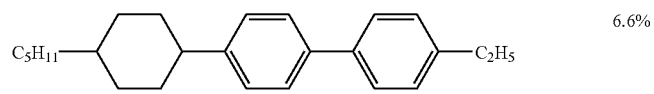

6.6%

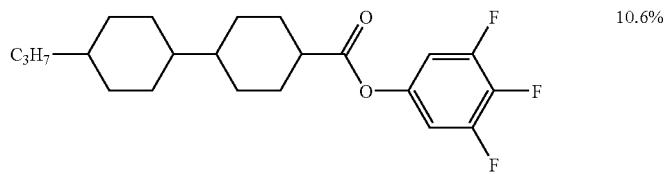

10.6%

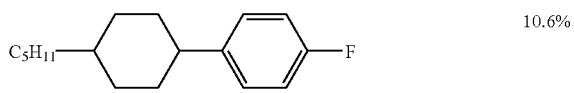

10.6%

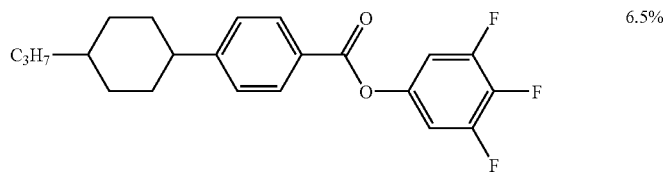

6.5%

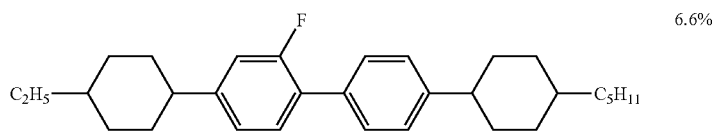

6.6%

TABLE 1-continued
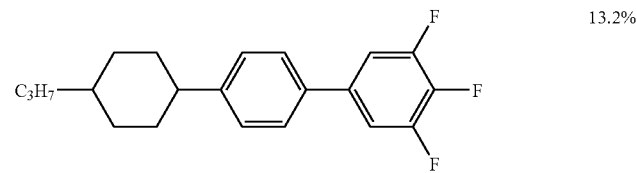 13.2%
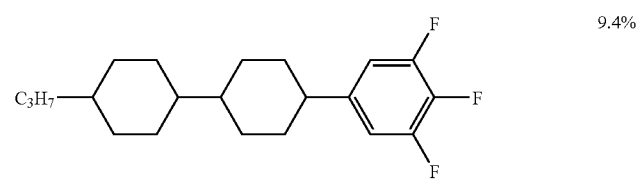 9.4%
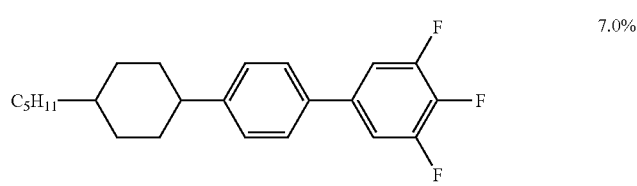 7.0%
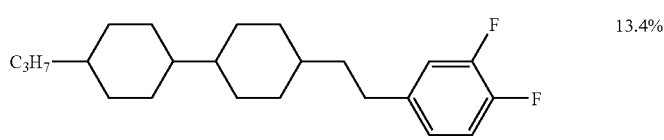 13.4%
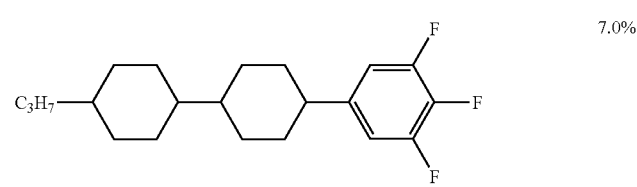 7.0%
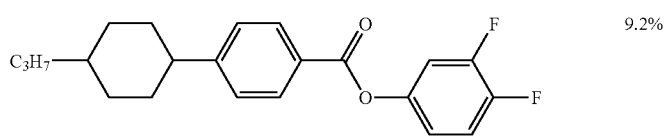 9.2%

The described liquid crystal combination had a dielectric anisotropy (Δε) of 9.48, a rotational viscosity ($\gamma_1$) of 285 mPas, and a clear point temperature of 94.7° C. The compounds 1 and 2 and intermediate 1a were mixed with the liquid crystal combination, and the properties thereof were tabulated as in Table 2.

TABLE 2

C$_3$H$_7$—[cyclohexyl]—[phenyl]—C(=CH$_2$)CF$_3$

1

C$_5$H$_{11}$—[cyclohexyl]—[phenyl]—C(=CH$_2$)CF$_3$

2

C$_3$H$_7$—[cyclohexyl]—[phenyl]—C(=O)CF$_3$

1a

| Serial No. | Liquid crystal combination (%) | Compound | (%) | Δε | γ1 (mPas) | Tc (° C.) |
|---|---|---|---|---|---|---|
| 1 | 91.0 | 1 | 9.0 | 8.21 | 215 | 78.7 |
| 2 | 91.0 | 2 | 9.0 | 8.20 | 220 | 81.4 |
| 3 | 86.3 | 2 | 13.7 | 7.59 | 187 | 72.5 |
| 4 | 90.8 | 1a | 9.2 | 8.00 | 320 | 73.6 |
| 5 | 86.3 | 1a | 13.7 | 7.45 | 350 | 70.1 |

As shown in Table 2, both compounds 1 and 2 reduced the rotational viscosity of the liquid crystal combination, thereby reducing the response time. On the other hand, the intermediate 1a enhanced the rotational viscosity of the liquid crystal combination and increased the response time.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal compound, having a general formula:

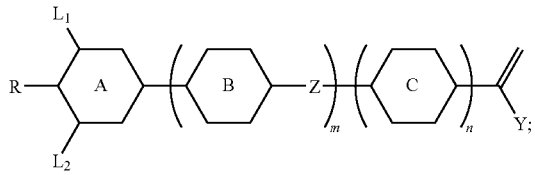

wherein R is H, F, Cl, linear or branched $C_{1-10}$ alkyl group, linear or branched $C_{1-10}$ alkenyl group, $C_{1-10}$ ether group, $C_{1-10}$ alkoxyl group, linear or branched $C_{1-10}$ fluorinated alkyl group, linear or branched $C_{1-10}$ fluorinated alkenyl group, or $C_{1-10}$ fluorinated ether group;

each of A, B, and C, being the same or different, is cyclohexyl group, cyclohexenyl group, or phenyl group;

each of $L_1$, $L_2$ being the same or different, is H or F;

Z is —C(=O)O—, —OC(=O)—, —CH$_2$O—, —OCH$_2$—, —CH$_2$CH$_2$—, —C≡C—, or —CH=CH—;

Y is CF$_3$, CF$_2$H, or CFH$_2$;

m, is an integer of 0-2;

n is an integer of 1-3; and

1≦m+n≦3.

2. A liquid crystal display, comprising:
a top substrate;
a bottom substrate; and
a liquid crystal layer disposed between the bottom substrate and the bottom substrate;
wherein the liquid crystal layer comprises the liquid crystal compound as claimed in claim 1.

3. An optoelectronic device, comprising the liquid crystal device as claimed in claim 2.

* * * * *